Patented Dec. 31, 1929

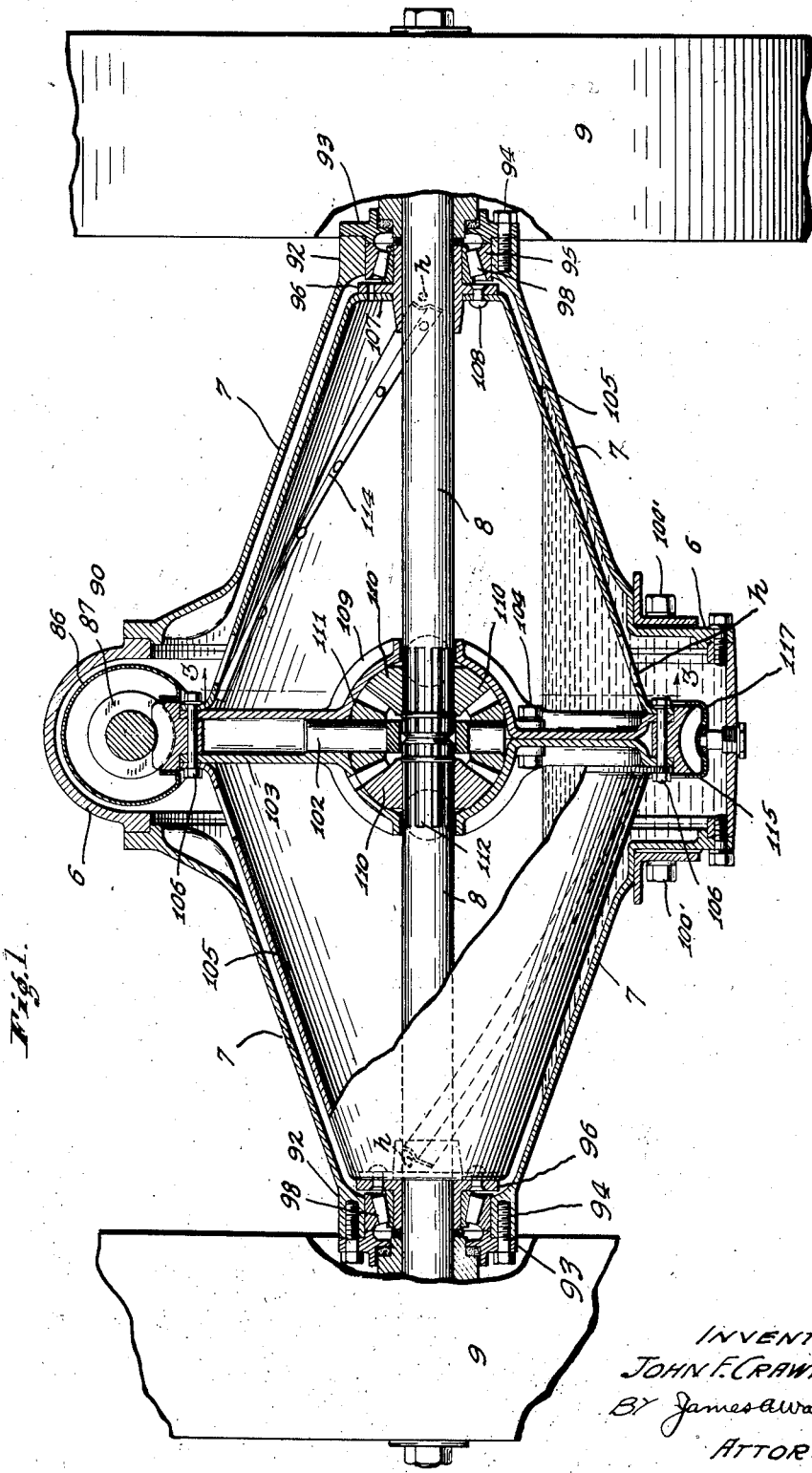

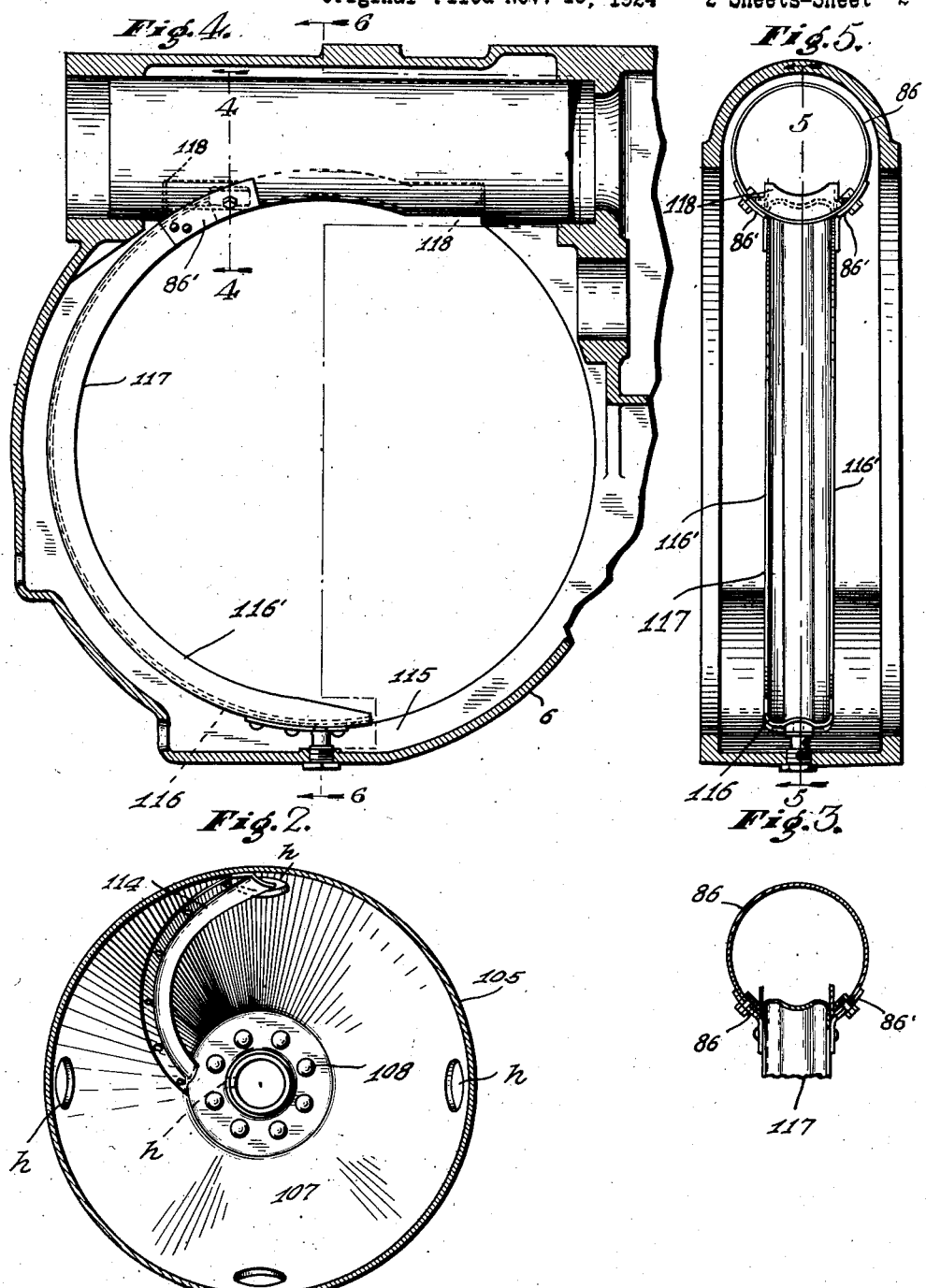

1,741,501

UNITED STATES PATENT OFFICE.

JOHN F. CRAWFORD, OF RACINE, WISCONSIN, ASSIGNOR TO J. I. CASE COMPANY, OF RACINE, WISCONSIN, A CORPORATION

LUBRICATING SYSTEM FOR DIFFERENTIAL VEHICLE HOUSINGS

Original application filed November 13, 1924, Serial No. 749,795. Divided and this application filed August 22, 1925. Serial No. 51,883.

My present invention relates to self-propelled vehicles, preferably of the tractor type as disclosed by my co-pending application Serial No. 749,795, filed November 13, 1924, of which this is a divisional application, my object being to provide a novel and efficient oiling system for the differential and transmission gears and parts associated therewith, as will more fully appear.

In the accompanying drawings, forming part hereof, Figure 1 is a detail section of the rear axle; Fig. 2 a detail section through the rear axle cone taken on the dotted line 3—3 in Fig. 1; Fig. 3 a detail section through the oil chamber taken on the dotted line 4—4 in Fig. 4; Fig. 4 a detail taken on the dotted line 5—5 in Fig. 5 showing the cylindrical casing and oil-boot which I employ; and Fig. 5 is a transverse sectional view on the dotted line 6—6 in Fig. 4 showing said chamber and boot.

In said drawings, Fig. 1, I have illustrated a rear axle housing of a highly improved form, embodying bearing means for the axle sections and lubricating means for the differential and transmission gears and parts associated therewith, but it will be understood that any appropriate rear axle structure to which my improvement is applicable may be employed. The transmission housing 6 contains the cylindrical chamber, 86, enclosing the ordinary worm gear, 87, forming an extension of a transmission (not shown), said worm meshing with gear wheel, 90, in a well known manner. Said gear wheel is enclosed within a housing, Fig. 1, comprising the bell shaped sections 7 secured to said transmission housing 6, and the outer ends of which sections terminate in the hubs, 92, which hold the carriers, 93, which in turn are mounted on the flanged collars, 96, on axle 8 and constitute bearings for the rollers, 98, the lower portions of said bell housing sections 7 being secured to the transmission housing 6 by bolts, 100', substantially as shown in Fig. 1. Gear ring 90 is carried on the spindles, 102, which in turn are clamped within a sheet metal spider comprising arms, 103, and secured thereabout by bolts, 104, said arms being also clamped at their outer ends between the inner cones, 105, by bolts, 106. Each of said inner cones is preferably a unitary structure having its end open for the reception of axle 8, said end, 107, being connected to flanged collar 96 by rivets or bolts, 108. The spider arms 103 form part of a spherical housing, 109, in which are seated differential gears, 110, 111, mounted on spindles 102, so that in connection with the splined ends, 112, of shaft sections 8 said gears become securely meshed and prevented from displacement. As a means for supplying oil through holes $h$ in the collar 96 to the bearings at the outer ends of axle sections 8 which support the wheels 9 I secure to the inner sides of cones 105 spirally disposed troughs, 114, which revolve about said axle as the cone structure 105 rotates by the action of the differential gearing spider 103, which pick up oil from chamber, 115, beneath gear wheel 90, the oil level being indicated by the dotted lines in Fig. 1. Secured to worm wheel chamber 86 by suitable connections 86' is a semicircular boot, 117, Fig. 4, which extends approximately half way around the periphery of gear wheel 90 and terminates in oil chamber 115. As said gear wheel teeth travel into said boot and are immersed in oil, said boot, comprising in part the bottom 116 and side walls, 116', confines the oil between the teeth until they reach the worm wheel chamber 86 when the oil is deposited therein for lubricating worm 87. An oil level is maintained in said chamber 86 by dams, 118, sufficiently high to cause the oil to forcibly overflow and be distributed through bearings contained in said chamber and also to other portions of the transmission, and returned to oil chamber 115. As will thus be seen, by employing the rotating troughs 114 and boot 117 and maintaining an oil level in the cones 105 substantially as shown in Fig. 2 I am enabled to distribute an oil supply to the axle and differential bearings as well as carrying sufficient for lubrication to the worm 87, and mechanism with which it communicates, by gear-wheel 90. As will be understood, I may provide a drip, for oil chamber 115, for releasing oil therefrom, in a well known manner. The gear teeth, as indicated, are confined within the walls of the boot and positively elevate a plentiful supply of oil into the cylindrical chamber 86 in such quantities as to lubricate and flood the worm 87, thus maintaining the latter, which is working under high pressure, in cool condition and prevents the heating thereof, and which worm urges the oil forwardly to other cooperating parts of the transmission mechanism; in other words, the teeth of the gear wheel in effect meters the oil constantly so that a uniform and plentiful supply is carried by each tooth to the worm.

I claim as my invention:

1. In a vehicle, the combination of an axle housing embodying an oil receptacle, rotary means in said housing adapted to travel through and elevate the oil therein, a casing connected to the housing, a worm in the casing meshing with and driving said rotary means, and an oil conveyor in the axle housing extending from the lower to the upper side thereof and through which a portion of the rotary means travels, said conveyor communicating with said casing whereby oil in the housing is carried upwardly by said rotary means and confined in the conveyor from the lower to the upper portion of the housing to be discharged into said casing for flooding the worm and which latter in turn distributes the oil to other mechanism.

2. In a vehicle, the combination, of an axle housing embodying an oil receptacle, a gear-casing connected to said housing, a driving-worm in said casing, an axle in said housing, a worm-wheel on said axle meshing with said worm and driven thereby, and means in said housing extending continuously from the lower to the upper portion thereof and partially enclosing the teeth of said worm-wheel for distributing oil to said worm, said worm-wheel elevating oil from said housing to said driving worm for lubricating the same and for distribution thereby to other mechanisms.

3. In a vehicle, an axle-housing having an oil receptacle therein, an axle in said housing, a spiral trough in said housing for collecting oil therefrom and distributing the same to said axle, a worm-wheel associated with said axle and traveling through said oil receptacle, a conveyor in the receptacle and partially enclosing the periphery of said worm-wheel for confining oil to be conveyed by the latter, and a worm engaging said worm-wheel and driving the latter to rotate said axle and to elevate oil by said worm-wheel from said receptacle to said worm.

4. In a vehicle, an axle-housing embodying an oil retainer, a transmission casing associated with said housing, a worm in said casing, a worm-wheel in said housing driven by said worm and rotating through the oil retainer, and a boot communicating with said oil retainer and with said transmission casing for conveying oil from said retainer to said casing.

5. In a vehicle, an axle housing, a wheel therein, a conveyer embodying bottom and sides extending from the lower to the upper side of the housing adjacent the periphery of said wheel and within which the rim of the wheel rotates, and a casing associated with said housing to which oil is delivered by said conveyer from the lower to the upper portion of said housing through the rotary action of the wheel.

6. In a vehicle, an axle-housing embodying an oil receptacle, a substantially semi-circular trough-like conveyer extending from the lower to the upper portion of said housing, rotary means in said housing the periphery of which travels through said receptacle and said conveyer, and a worm meshing with and actuating said rotary means to conduct oil through said conveyer to said worm.

7. In a vehicle, a worm casing, a worm therein, an oil dam in said casing, an axle housing connected to said casing, a worm wheel mounted in the housing and driven by said worm, and an oil conveyor in the housing extending from the lower to the upper side thereof and terminating in proximity to said worm casing whereby oil is conveyed from the housing to the casing for flooding and cooling the worm therein and lubricating parts associated with the worm.

8. In a vehicle, the combination of an axle housing embodying an oil receptacle, a conveyor in the housing, a casing connected to the housing said casing having dams therein for retaining oil, a worm in the casing, and a wheel in the housing driven by the worm a portion of said wheel rotating in said conveyor for carrying oil from the housing and discharging the same between the dams in said casing.

9. In a vehicle, an axle housing embodying bearings, an axle mounted in the bearings, a wheel in the housing, a conveyor in the housing revolvable about the axles for distributing oil to the bearings, a worm engaging with and rotating the wheel, a casing enclosing the worm, and a conveyor in the housing communicating with said casing through which a portion of the wheel rotates for carrying oil from the lower portion of the housing to the worm in said casing.

In testimony whereof I affix my signature.

JOHN F. CRAWFORD.